United States Patent [19]

Ramey

[11] 4,005,583
[45] Feb. 1, 1977

[54] COMBINATION HEAT PUMP AND LOW TEMPERATURE SOLAR HEAT COLLECTOR

[76] Inventor: Harry Borders Ramey, Rte. 5, Box 272, Berea, Ky. 40403

[22] Filed: Dec. 5, 1974

[21] Appl. No.: 529,995

[52] U.S. Cl. .................................. 62/2; 126/271; 62/324

[51] Int. Cl.[2] .................. F25B 27/00; F24J 3/02

[58] Field of Search ............ 62/324, 432, 524, 231, 62/2; 126/270, 271; 237/1 A; 60/641

[56] References Cited
UNITED STATES PATENTS

| | | | |
|---|---|---|---|
| 2,289,809 | 7/1942 | Sherwood | 126/271 |
| 2,461,449 | 2/1949 | Smith et al. | 60/641 |
| 3,886,998 | 6/1973 | Rowekamp | 237/1 A |

Primary Examiner—Kenneth W. Sprague
Assistant Examiner—James C. Yeung

[57] ABSTRACT

A combination heat pump and low temperature solar heat collector includes a compressor and lines having a restrictor for forming vapor and condensate sections. The collector comprises containers for liquid, which may be water, mixed with substances for lowering the freezing point and for darkening the liquid or for influencing the heat conductivity. The heat pump has a reversing valve to convert the evaporator tubes, winter setting, to condenser tubes, summer setting. Solar radiation or ambient air restores heat to the cooled water.

9 Claims, 3 Drawing Figures

COMBINATION HEAT PUMP AND LOW TEMPERATURE SOLAR HEAT COLLECTOR

The present invention is similar in some respects to that disclosed in my application, Ser. No. 520,727, filed Nov. 4, 1974.

BRIEF SUMMARY OF THE INVENTION

The invention relates to a heat pump for cooling or heating an enclosure such as a building.

Heat pumps depending solely upon air to supply heat must move more mass than those using water. Heat pumps using water usually employ water from lakes or wells and circulate great quantities. The present invention makes use of a relatively small quantity of water and, instead of wasting the water, retains it for subsequent use. When the device is being used for space heating, the evaporator tubes may freeze ice, thus removing the heat of fusion. When the device is being used for cooling, the condenser tubes evaporate water, giving their heat to supply the heat of vaporization.

DETAILED DESCRIPTION

Figure 1:
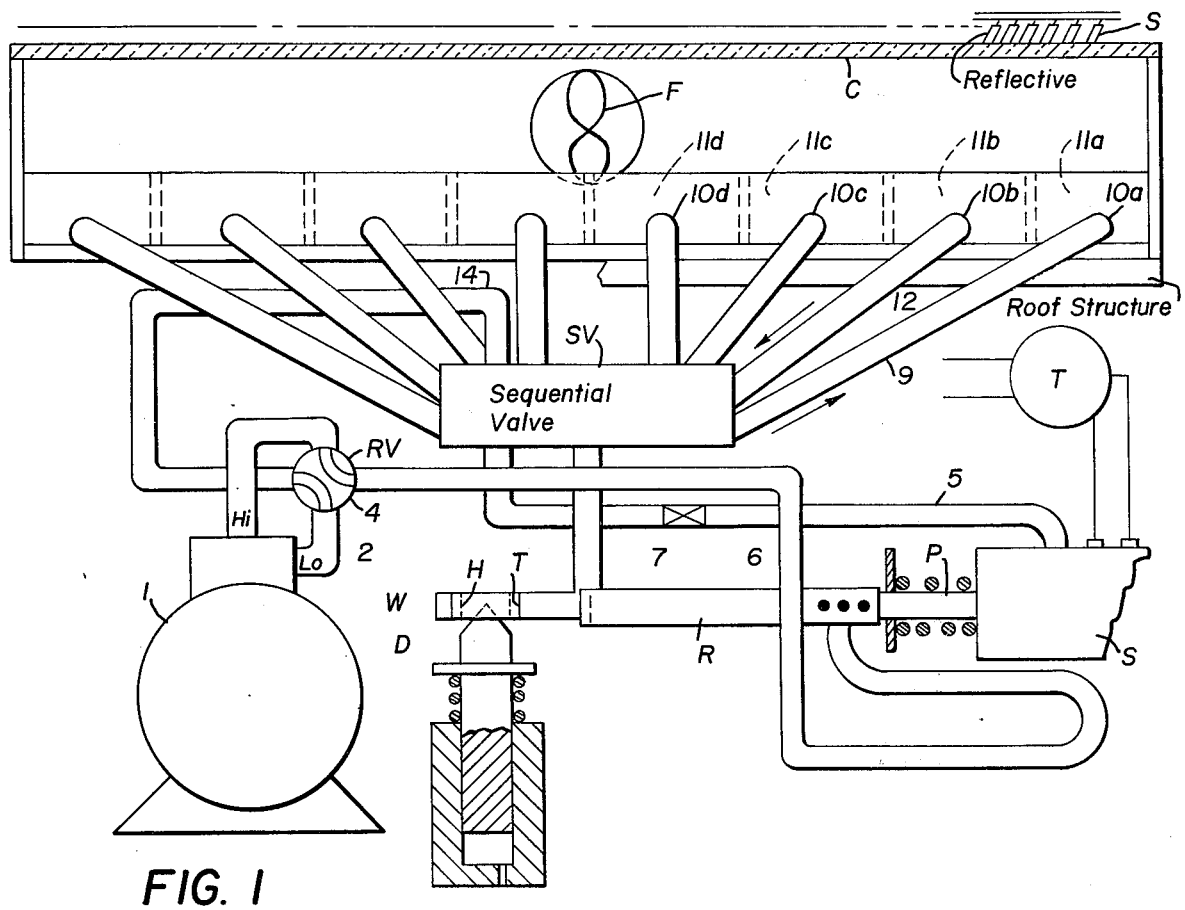
FIG. 1 is a schematic showing of the heat pump including the lines extending into water compartments.
Figure 3:
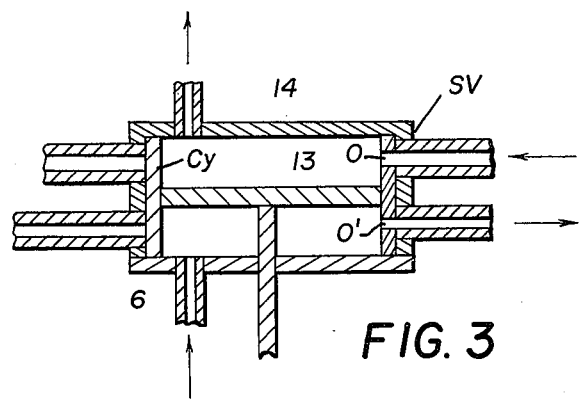
FIG. 3 shows the interior of the valve used to direct the refrigerant fluid to the water compartments sequentially.

Referring to FIG. 1, the drawings show a compressor 1 having a low pressure line 2 and a high pressure line 3. Reversing valve 4 is shown in the position used in cold weather. High pressure refrigerant fluid flows through valve 4 (also marked RV) to coil 5, to line 6, through restrictor 7, into the distributor valve 8 and out into line 9 to an outside tube functioning as an evaporator tube 10. The refrigerant fluid evaporates, in tube 10, cooling and/or freezing the water in compartments 11a and 11b. The refrigerant is then returned through line 12 to the valve cavity above divider 13, FIG. 3. Line 14 leads to the low pressure side of compressor 1. After an appropriate period of time, timer T operates the electrical device S which moves plunger P to the right causing spring ratchet R to move ratchet wheel W. The ratchet R engages teeth T, and a reciprocating motion of the plunger P revolves the ratchet wheel W. Spring pressed detent D is received in hole 4 to position the rotary cylinder Cy so that its openings 0 and 0' register with the inlets or outlets of appropriate tubes leading to the water compartments. After the timer T has caused the valve SV to sequentially supply all the tubes with vaporized refrigerant fluid, it will again supply tubes 10a and 10b. Meanwhile, the compartments previously cooled have been warmed by solar radiation passing through the transparent cover C. The heat restored to the water in compartments 10a and 10b is now available for transfer by the heat pump to coil 5 for space heating purposes. When compartments 11a and 11b contain ice, heat transfer from tubes 11a and 11b to the ice is slow. Therefore, to provide for heating during sub freezing weather, salt or some other antifreeze must be added to the water to keep it in the liquid state. If the temperature is low and the sun is not shining, the low temperature brine or ice can, nevertheless, be warmed by air furnished by fan F.

Figure 2:
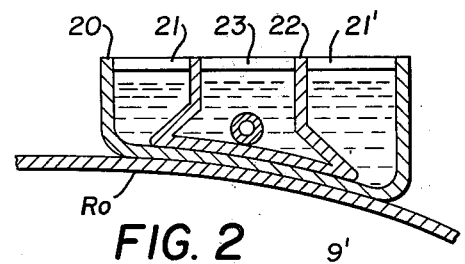
FIG. 2 shows a modified form of water compartment.

In colder climates each compartment 11 may be divided into smaller channels, as shown in FIG. 2. Channel member 22 divides the space inside channel member 20 into channels 21, 21' and 23. Channel 23 contains water having its freezing point low enough so that ice will freeze in channels 21 and 21' before it freezes in channel 23. In extremely cold weather ice may remain in channel 21 and channel 21' most of the time, the water in channel 23 freezing periodically. When no sunshine falls on the water compartments, air may be forced over the ice or water to restore the heat taken out by the evaporator tubes.

It should be noted that while the ice is being frozen the temperature remains constant. Consequently, the temperature difference between the evaporator tubes and the freezing liquid remains constant until all the heat of fusion has been removed. The low temperature solar collector formed by the water compartment walls, which may be blackened, and the water, which may contain a colored suspension, restores heat to the ice without creating an unfavorable temperature gradient across transparent cover C.

In warm weather the valve 4 may be turned to reverse the flow of refrigerant so that the tubes 10 become condensers, giving up heat to the water which cools itself by evaporation and, at night, radiation from the compartment bottoms and walls to the atmosphere and to space will also remove heat and form a sink into which heat can be transferred from the inside to the outside of the enclosure by the heat pump.

Shutters S may be provided as a sun shield and may be formed of reflecting material to direct sunlight into the water compartments.

FIG. 2 shows the tray 20 resting on an arched member Ro which could be the roof of a trailer type dwelling. The present invention is readily adaptable to buildings having flat or nearly flat rooves.

What is claimed is:

1. A heat transfer means including a heat pump comprising a compressor having high and low pressure lines containing a refrigerant, a heat exchange device, said heat exchange device having means forming separate compartments therein, a distinct mass of material in each of said compartments, heat transfer ducts disposed in heat exchange relation with said mass of material in each of said compartments, said heat transfer means including circulation means to conduct said refrigerant from said compressor through said lines and into said heat transfer ducts in heat exchange relation with said distinct masses in said heat exchange device, said circulation means including a second means to sequentially direct the refrigerant into only one of the heat transfer ducts while the other ducts are disconnected from said circulation means, and means to expose said compartments to the open sky including the portion of the sky encompassing the apparent path of the sun, thereby tending to restore the original level of heat energy to said disconnected portions.

2. The heat pump of claim 1 wherein the mass of material is a liquid.

3. The heat pump of claim 2 wherein the mass of material is water.

4. The heat pump of claim 3 wherein the water contains material for lowering the freezing point.

5. The heat pump of claim 4 wherein each said portion of water is divided into components having different freezing points.

6. The heat pump of claim 1 including a reversing valve means to reverse the connections of the high pressure and low pressure lines to the said mass and to the said heat exchange device.

7. The heat pump of claim 6 having a transparent cover for the mass of material.

8. The heat pump of claim 7 having a means to move air into heat exchange with said distinct masses.

9. The heat pump of claim 8 having reflective shutters for directing sunlight onto the mass.

* * * * *